June 2, 1964  H. C. DECK  3,135,158
SAFETY SHUTTER FOR MOTION PICTURE PROJECTORS
Filed June 9, 1961  2 Sheets-Sheet 1

INVENTOR.
HOWARD C. DECK
BY
Attorney

June 2, 1964    H. C. DECK    3,135,158
SAFETY SHUTTER FOR MOTION PICTURE PROJECTORS
Filed June 9, 1961    2 Sheets-Sheet 2
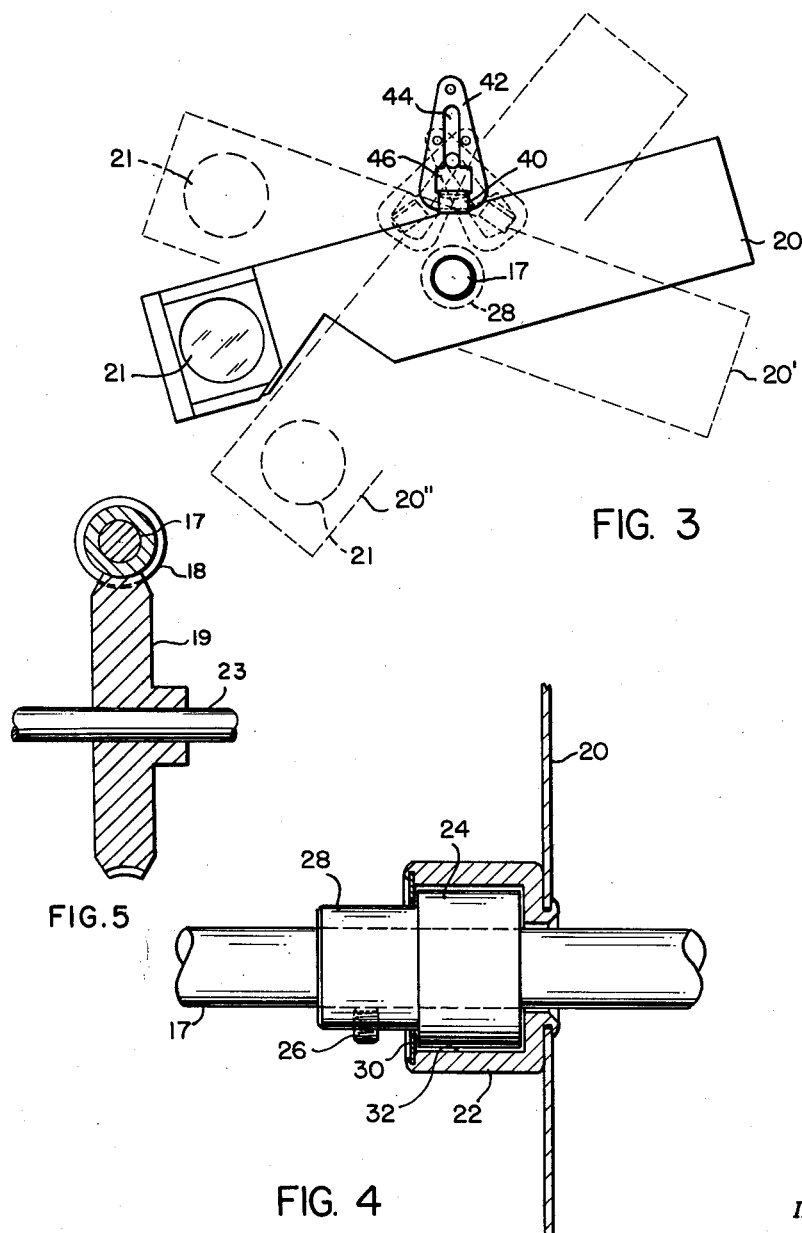
INVENTOR.
HOWARD C. DECK 3,135,158
SAFETY SHUTTER FOR MOTION PICTURE
PROJECTORS
Howard C. Deck, Rochester, N.Y., assignor to Graflex, Inc., Rochester, N.Y., a corporation of New York
Filed June 9, 1961, Ser. No. 116,040
6 Claims. (Cl. 88—17)

The present invention relates to motion picture projectors, and more particularly to means for protecting motion picture film from being burned by the heat of the projection lamp when transport of the film is stopped in order to view a single frame of the film.

A primary object of the present invention is to provide a safety shutter for motion picture projectors which will automatically be moved into position to protect the film whenever transport of the film is stopped.

Another object of the invention is to provide a safety shutter and mechanism for operating the same which will automatically move the safety shutter into operative position, when transport of the film is stopped, regardless of whether the film is being moved forward or reversed.

Another object of the invention is to provide a simple, inexpensive, but reliable slip clutch for applying torque to a load with slip clutch action, and particularly for use in a motion picture projector, which will drive a safety shutter to inoperative position upon operation of the film transporting mechanism, but which will permit rapid movement of the safety shutter to operative position when the film transporting mechanism stops.

Other objects of the invention will be apparent hereinafter from the specification and from the recital of the appended claims particularly when taken in conjunction with the accompanying drawings.

In the drawings:

FIG. 3 is a view showing three possible positions of the safety shutter, the shutter being shown in full lines in operative position as illustrated in FIG. 2, and the shutter being shown in dotted lines in the two positions it can assume when the film is being driven forward, and when it is being reversed, respectively;

FIG. 4 is a sectional view on an enlarged scale showing the shutter fragmentarily, and the slip clutch for driving the same from the main shaft of the projector; and FIG. 5 is a fragmentary view illustrating means for transporting the film.

Figure 1:
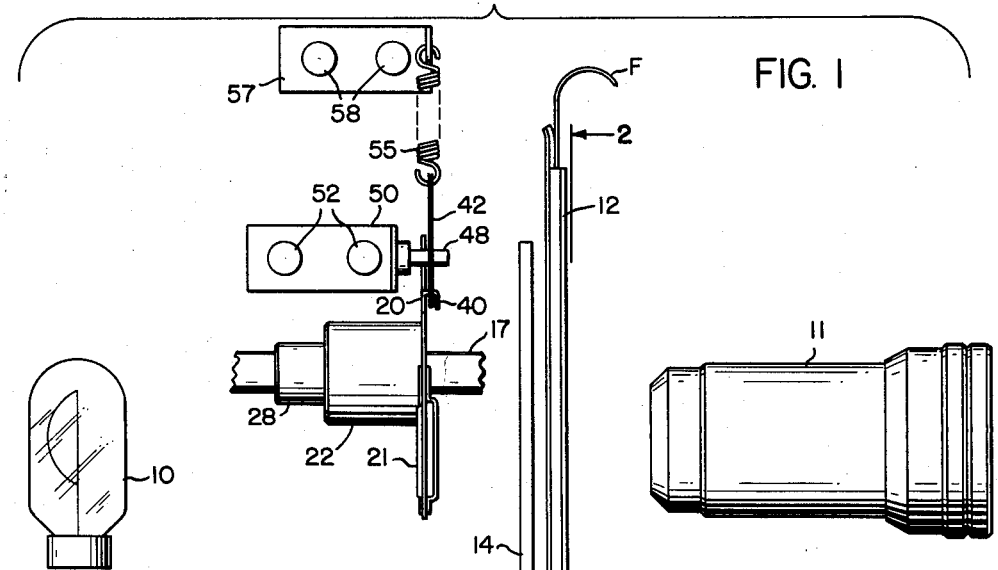
FIG. 1 is a more or less diagrammatic view in side elevation illustrating a motion picture projector equipped with the safety shutter of the present invention and showing this shutter in operative position.

Referring now to the drawings by numerals of reference, 10 denotes a conventional projection lamp such as employed in a conventional motion picture projector; 11 designates the conventional projection lens of the projector; and 12 denotes the conventional film gate or aperture plate of the projector. The film gate is disposed between the lamp 10 and the projection lens 11, and has an aperture 13 therein which is located in the beam from the light source 10, and which, as is usual, is the size of a film frame. A conventional shutter 14 is interposed between the film gate 12 and the projection lamp 10. The motion picture film F, which is to be projected, is fed in conventional manner from a sprocket 15, down through the film gate or aperture plate, past the aperture 13 therein to the sprocket 16. The sprockets may be driven through conventional mechanism from the main drive shaft 17 of the projector. Thus, as illustrated in FIG. 5, sprocket 16 may be driven from shaft 17 through a worm 18 secured to or intergral with shaft 17 and a wormwheel 18 which meshes with the worm, and which is secured to a shaft 23 to which the sprocket 16 is fastened.

The safety shutter, which is separate from the shutter 14 used in the projection of the film, comprises a rectangular plate 20, which carries a piece of heat-absorbent glass 21, which is adapted to be interposed between the lamp 10 and the film F to protect the film from being burned up when a single frame of the film is being viewed. The safety shutter 20 is secured, as, for instance, by staking to a cup-shaped member 22 (FIG. 4), that forms part of a slip clutch. The cup-shaped member 22 surrounds a drum member 24, which has an integral hub portion 28 that is secured to the main drive shaft 17 of the projector by a setscrew 26. The drum, including its hub portion 28, is mounted on the shaft 17 coaxially thereof. A washer 30, which is secured to the cup 22 by spinning over the adjacent end of the cup, serves to retain the drum in the cup against axial movement relative thereto.

There is a slight clearance provided between the periphery of the drum 24 and the opposed internal cylindrical wall surface 32 of the cup. This clearance may amount to say .001″. The clearance space between the periphery of the drum and the inside wall of the cup is filled with a liquid, such as a silicone liquid, whose viscosity is sufficient to drive the cup from the drum when the drum is rotating with the shaft 17, but whose viscosity is nevertheless low enough to permit the cup to move relative to the drum, that is, to slip relative to the drum when the shaft 17 is stopped. Suitable fluids are: Union Carbide No. L-45 and No. L-527, and Dow Corning No. 200, No. 210, No. 510, No. 330, No. 550R, No. 560, and No. 710.

The shutter 20 has a tab or lug 40 struck from it at a point offset from shaft 17. This tab or lug is engaged by a clip or link 42. This clip or link has a slot 44 in it, which is enlarged at its bottom portion 46 to receive the lug or tab 40. The lug or tab is bent over to engage the clip and is adapted to slide and rock in the enlarged portion 46 of slot 44 of the clip. The narrower portion of the slot 44 engages and rides on a pin 48 which projects forwardly from a bracket 50 that is secured by means of rivets 52 to the projector. A coil spring 55 is connected at one end to the upper end of the clip 42, and is secured at its other end to a plate 57 which is also fastened to the machine by rivets 58.

Figure 2:
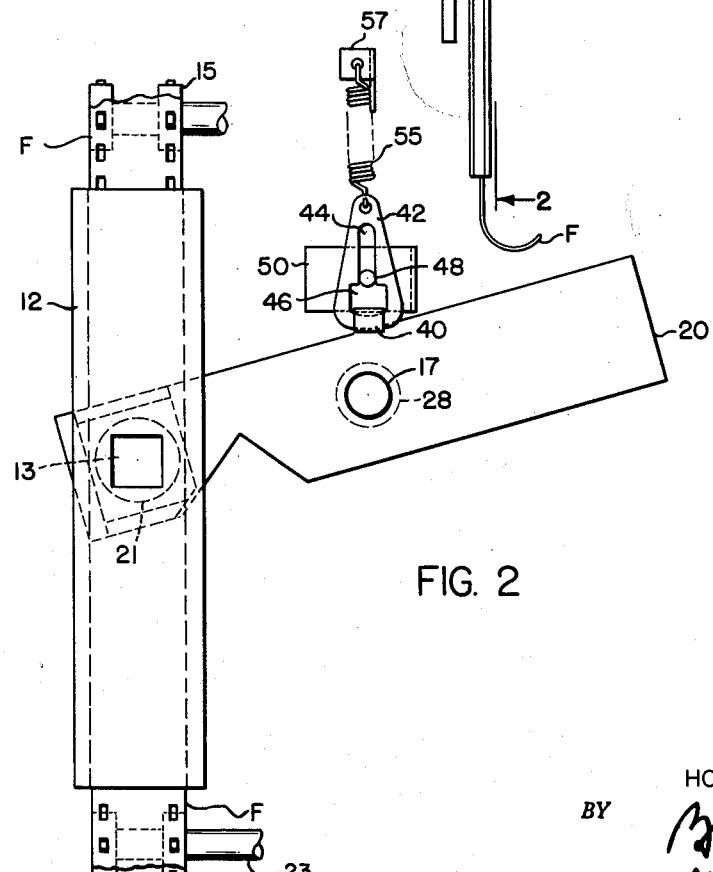
FIG. 2 is a front view of the shutter and film gate of the projector, and showing the safety shutter in operative position, the view being taken on the line 2—2 of FIG. 1, looking in the direction of the arrows.

When the main shaft 17 of the projector is started in a forward direction, the drum 24 drives the cup 22 through the liquid between the periphery of the drum and the opposed inside wall of the cup so that the safety shutter 20 is driven to the inoperative position shown in dotted lines at 20′ in FIG. 3, where it is stopped by the engagement of pin 48 with the upper end of slot 44. As the shaft 17 continues to rotate the clutch 22—24 slips but the torque it transmits is sufficient to hold the shutter in the position to which it has been moved by the clutch. When the main drive shaft is stopped, however, as for viewing a single frame of the film, the spring 55 snaps the shutter 20 immediately back to operative position shown in full lines in FIG. 3. The silicone liquid between the drum 24 and the inside surface 32 of the cup allows this return movement. In the full-line position 20 the filter 21 is disposed in back of the frame opening 13 in the film gate between the lamp 10 and the film F, thereby protecting the film. When the main shaft 17 is driven in reverse direction, the clutch 22—24 moves the safety shutter to the inoperative position shown in dotted lines at 20″ in FIG. 2. Again the spring 55 permits this movement, while the pin 48 by its engagement with the upper end of slot 44 limits this movement. The safety shutter 20 is held in position 20″ as long as the film is running in reverse. When the drive shaft 17 is stopped, however, to permit viewing a frame of the film, the spring 55 again snaps the safety shutter to its operative position, shown in full lines at 20 in FIG. 3.

The members 22, 24 and the liquid interposed between these members act not only as a coupling, as described, but they provide a bearing for the safety shutter. The space between the members 22 and 24 is extremely slight; and the silicone liquid is in effect a lubricant between members 22 and 24 so that member 22 and the safety shutter, which is secured to it, can rotate freely on drum 24.

The clutch described may, of course, be used in other installations where a slip clutch is desired for transmitting a limited torque, and particularly where it is desired to return a part to a starting position when the driving torque is no longer applied to the driven part.

While the invention has been described then in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In a motion picture projector having a projection lamp, a projection lens, a drive shaft, and means driven in time with said shaft for transporting film across the beam of light between the lamp and the lens to effect projection of the film, a pivotal safety shutter movable between an intermediate operative position and two inoperative positions at opposite sides, respectively, of said intermediate position, said safety shutter when in operative position being interposed between the lamp and the lens to protect the film, a slip clutch connecting said shaft with said shutter to pivot said shutter to one of its inoperative positions when said shaft is running at a predetermined speed in either direction, the inoperative position to which said shutter is pivoted depending upon the direction of movement of said shaft, a link connected at one end to said shutter to be movable therewith in either direction from an intermediate position, a stationary member engaging said link for limiting the movement of said link and shutter in either direction under actuation of said shaft, and spring means connected to said link for returning said link to its intermediate position and said shutter to operative position once the speed of said shaft falls below said predetermined speed.

2. In a motion picture projector as claimed in claim 1 wherein said slip clutch comprises a member connected to said shaft to rotate therewith, a second member surrounding the first-named member and having an internal surface spaced slightly radially from the opposed peripheral surface of said first-named member, and a liquid disposed between said surfaces, said liquid being viscous enough to transmit torque between said members.

3. In a motion picture projector as claimed in claim 2, wherein said first-named member is a cylindrical drum, and said second member is a cup-shaped member surrounding said drum, and having an inside cylindrical wall surrounding and spaced slightly radially from the peripheral surface of said drum.

4. In a motion picture projector having a projection lamp, a projection lens, a drive shaft, and means driven in time with said shaft for transporting film across the light beam extending between the lamp and the lens, the improvement comprising a safety shutter movable between operative and inoperative positions, said safety shutter when in operative position being interposed between the lamp and the lens to protect the film, a slip clutch for rotating said shutter to inoperative position when said drive shaft is rotating in either direction comprising a member on said shaft having an external cylindrical surface, a second member secured to said shutter and to which said shutter is mounted, said second member having an internal cylindrical surface spaced slightly radially from and surrounding said external cylindrical surface, and a liquid in the radial space between said cylindrical surfaces and viscous enough to transmit torque between said members when said shaft is running, a slotted link, a tab connected to said shutter at a point offset from said shaft and mounted to slide and rock in the slot of said link, a guide pin secured to a relatively stationary part of said projector and engaging in said slot to control and limit the movement of said shutter, and a coil spring connected at one end to said link at a point offset from the point of connection of said link with said tab and connected at its other end to a relatively stationary part of said projector, said spring serving to return said shutter to operative position when said shaft is stopped, said liquid being fluid enough to permit said clutch to slip when said shutter has been moved to inoperative position and permitting said spring to return said shutter to operative position when said shaft is stopped.

5. In a motion picture projector having a projection lamp, a projection lens, and drive means including a shaft rotatable in opposite directions, respectively, for transporting film across the beam of light between the lamp and the lens selectively both in forward and reverse directions, respectively, to effect projection of the film, the improvement comprising a safety shutter rotatably mounted on said shaft for movement between inoperative and operative positions, said shutter when in its operative position being interposed between the lamp and the film to protect the film, resilient means connected to said shutter and operative, when said shaft is stationary, to move said shutter to operative position, fluid slip clutch means connecting said shutter and said shaft for transmitting torque between said shaft and shutter and operative upon rotation of said shaft in either direction to move said shutter angularly about the axis of said shaft from its operative position to inoperative position but permitting movement of said shutter to operative position under actuation of said resilient means, said resilient means including a link pivotally connected to one end to said shutter and engageable with a stationary element on said projector upon movement of said shutter to inoperative position thereby to limit the extent of movement of said shutter away from operative position and a spring connected to said link and constantly urging said shutter through said link to operative position.

6. In a motion picture projector having a projection lamp, a projection lens, a drive shaft, and means driven by said shaft in time with said shaft for transporting film across the beam of light between said lamp and said lens to effect projection of the film, a cylindrical drum fixed on said shaft, a cup surrounding said drum and having an internal cylindrical surface spaced slightly radially from the peripheral cylindrical surface of said drum, a liquid filling said space, said drum, cup and liquid constituting a slip clutch operative to transmit rotary motion to said cup from said drum when said shaft is rotating in either direction but permitting relative movement between said cup and drum, a safety shutter secured to said cup to rotate therewith, means limiting the rotary movement of said shutter in both directions, and means constantly urging said shutter to a mean position intermediate its limit positions, whereby said shutter is moved to said mean position when said shaft is stopped, said safety shutter being so disposed that in said mean position it is interposed between said lamp and said lens to protect the film.

References Cited in the file of this patent

UNITED STATES PATENTS

| | | |
|---|---|---|
| 1,885,631 | Sapier | Nov. 1, 1932 |
| 1,972,602 | Robbins | Sept. 4, 1934 |
| 2,009,532 | Taylor | July 30, 1935 |
| 2,383,824 | Schulz | Aug. 28, 1945 |
| 2,441,313 | Fairbanks | May 11, 1948 |

FOREIGN PATENTS

| | | |
|---|---|---|
| 482,098 | Great Britain | Mar. 23, 1938 |